United States Patent
Melvin, III et al.

(10) Patent No.: US 7,320,119 B2
(45) Date of Patent: *Jan. 15, 2008

(54) METHOD AND APPARATUS FOR IDENTIFYING A PROBLEM EDGE IN A MASK LAYOUT USING AN EDGE-DETECTING PROCESS-SENSITIVITY MODEL

(75) Inventors: Lawrence S. Melvin, III, Hillsboro, OR (US); James P. Shiely, Aloha, OR (US); Qiliang Yan, Hillsboro, OR (US); Benjamin D. Painter, Tigard, OR (US)

(73) Assignee: Synopsys, Inc., Mountain View ( * ) Notice: Subject to any disclaimer, the term of this patent is extended or adjusted under 35 U.S.C. 154(b) by 308 days.

This patent is subject to a terminal disclaimer.

(21) Appl. No.: 11/124,328

(22) Filed: May 6, 2005

(65) Prior Publication Data

US 2006/0190914 A1    Aug. 24, 2006

Related U.S. Application Data

(63) Continuation-in-part of application No. 11/065,409, filed on Feb. 24, 2005.

(51) Int. Cl.
*G06F 17/50* (2006.01)
(52) U.S. Cl. .................. 716/21; 716/19; 716/20; 430/5; 430/30
(58) Field of Classification Search .............. 716/1–21; 430/5, 30, 40
See application file for complete search history.

(56) References Cited

U.S. PATENT DOCUMENTS

| | | | |
|---|---|---|---|
| 5,965,309 A * | 10/1999 | Ausschnitt et al. | 430/30 |
| 6,183,919 B1 * | 2/2001 | Ausschnitt et al. | 430/30 |
| 6,453,457 B1 * | 9/2002 | Pierrat et al. | 716/19 |
| 6,777,138 B2 * | 8/2004 | Pierrat et al. | 430/5 |
| 6,904,587 B2 * | 6/2005 | Tsai et al. | 716/19 |
| 6,978,438 B1 * | 12/2005 | Capodieci | 716/21 |
| 2002/0164065 A1 * | 11/2002 | Cai et al. | 382/149 |
| 2003/0121021 A1 * | 6/2003 | Liu et al. | 716/19 |
| 2005/0089768 A1 * | 4/2005 | Tanaka et al. | 430/5 |

OTHER PUBLICATIONS

Qiuming Zhu, Improving Edge Detecting by An Objective Edge Evaluation, 1992, ACM, pp. 459-468.*

* cited by examiner

*Primary Examiner*—Jack Chiang
*Assistant Examiner*—Nghia M. Doan
(74) *Attorney, Agent, or Firm*—Park, Vaughan & Fleming LLP

(57) ABSTRACT

One embodiment of the present invention provides a system that identifies a problem edge in a mask layout which is likely to have manufacturing problems. During operation, the system creates an on-target process model that models a semiconductor manufacturing process under nominal process conditions. The system also creates one or more off-target process models that model the semiconductor manufacturing process under one or more process conditions that are different from nominal process conditions. Next, the system computes a process-sensitivity model using the on-target process model and the off-target process models. The system then computes an edge-detecting process-sensitivity model by convolving the process-sensitivity model with an edge-detecting function which can be used to detect edges in an image. Next, the system identifies a problem edge in the mask layout using the edge-detecting process-sensitivity model.

14 Claims, 8 Drawing Sheets

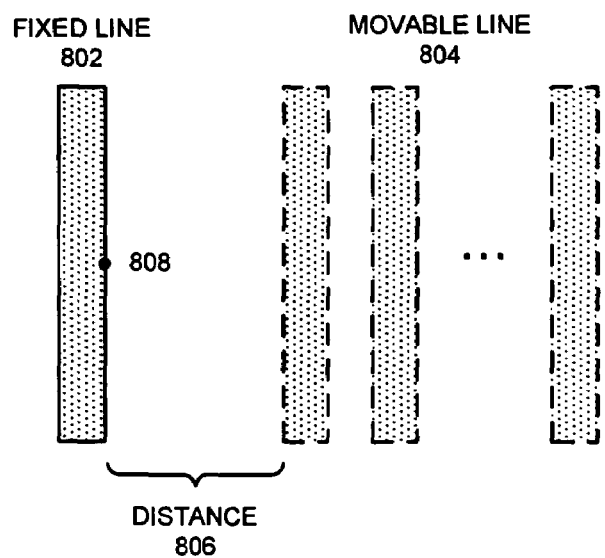
FIG. 8
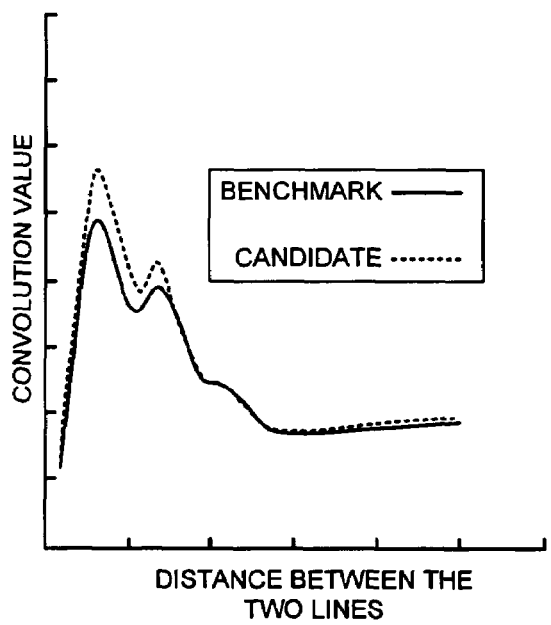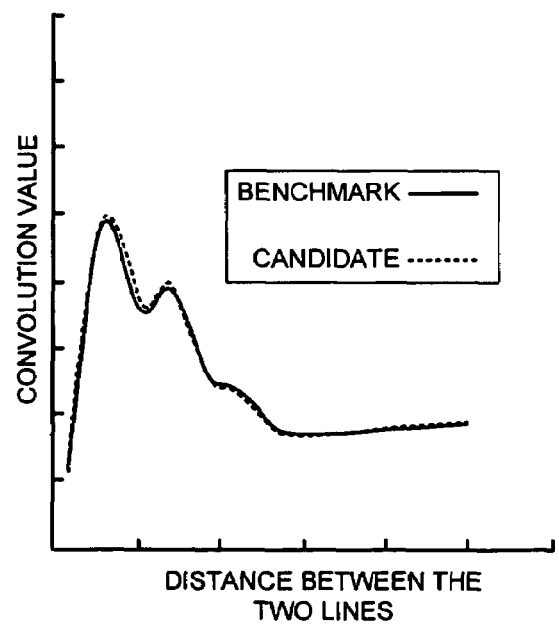
FIG. 9A  FIG. 9B

METHOD AND APPARATUS FOR IDENTIFYING A PROBLEM EDGE IN A MASK LAYOUT USING AN EDGE-DETECTING PROCESS-SENSITIVITY MODEL

RELATED APPLICATION

This application is a continuation-in-part of, and hereby claims priority under 35 U.S.C. § 120 to, U.S. patent application Ser. No. 11/065,409, entitled, "METHOD AND APPARATUS FOR IDENTIFYING A MANUFACTURING PROBLEM AREA IN A LAYOUT USING A PROCESS-SENSITIVITY MODEL," by inventors Lawrence S. Melvin III and James P. Shiely filed on 24 Feb. 2005. Furthermore, the above listed reference is hereby incorporated by reference herein to provide details of how a process-sensitivity model can be used to identify a manufacturing problem area.

BACKGROUND

1. Field of the Invention

The present invention is related to semiconductor manufacturing. More specifically, the present invention is related to a method and apparatus for identifying an edge in a photomask layout which is likely to have manufacturing problems.

2. Related Art

Semiconductor manufacturing technologies typically include a number of processes which involve complex physical and chemical interactions. Since it is almost impossible to perfectly control these complex physical and chemical interactions, these processes typically have process variations that can cause the characteristics of the actual integrated circuit to be different from the desired characteristics. If this difference is too large, it can lead to manufacturing problems which can reduce the yield and/or reduce the performance of the integrated circuit.

Consequently, to be economically viable, a semiconductor manufacturing process has to be robust with respect to process variations, i.e., it must be able to tolerate a large enough range of process variations. (In the following discussion, we describe the present invention in the context of "depth of focus," which is a common process variation in photolithography. But, it will be apparent to one skilled in the art that the present invention can be readily applied to other manufacturing process variations, such as, dose variation, resist thickness variations, etch variations, and doping variations.)

Specifically, improving the depth of focus directly results in cost savings. This is because it can substantially increase the throughput by reducing the amount of time spent on inspection, servicing, and maintenance of the equipment. In addition, the actual process conditions encountered during manufacturing may vary due to a variety of reasons. For example, topographical variations on the wafer can occur due to imperfections in the chemical-mechanical polishing process step. As a result, improving the depth of focus can increase the yield for chips that are manufactured in the presence of these process variations.

Unfortunately, improving depth of focus can be very challenging, especially at deep submicron dimensions. To improve the manufacturability of integrated circuits, process engineers typically create sophisticated rule tables that specify the sizes and shapes of various features on a mask layout. Unfortunately, at deep submicron dimensions, these rule tables can be extremely large and unwieldy. Moreover, rule tables can be overly restrictive which can prevent designers from being able to achieve the best device performance.

Note that, if we can identify problem edges in a mask layout that are likely to have manufacturing problems, we can improve the manufacturability of the mask layout by correcting these problem edges.

Hence, what is needed is a method and an apparatus to identify a problem edge in a mask layout.

SUMMARY

One embodiment of the present invention provides a system that identifies a problem edge in a mask layout which is likely to have manufacturing problems. During operation, the system creates an on-target process model that models a semiconductor manufacturing process under nominal process conditions. The system also creates one or more off-target process models that model the semiconductor manufacturing process under one or more process conditions that are different from nominal process conditions. Next, the system computes a process-sensitivity model using the on-target process model and the off-target process models. Note that a process model (on-target, off-target, or process-sensitivity) can be represented by a multidimensional (e.g., 2-D) function that captures the process-sensitivity information. The system then computes an edge-detecting process-sensitivity model by convolving the process-sensitivity model with an edge-detecting function which can be used to detect edges in an image. Next, the system identifies a problem edge in the mask layout using the edge-detecting process-sensitivity model. Specifically, the system can compute a problem-indicator by convolving the edge-detecting process-sensitivity model with a multidimensional function that represents the mask layout. Next, the system can identify the problem edge by comparing the value of the problem-indicator with a threshold.

Note that identifying the problem edge allows it to be corrected, which improves the manufacturability of the mask layout. Moreover, using the edge-detecting process-sensitivity model to identify the problem edge reduces the computational time required to identify the problem edge. Specifically, the edge-detecting process-sensitivity model allows multiple process conditions to be explored at once. Moreover, the edge-detecting process-sensitivity model directly identifies the problem edge for the end-user. As a result, the end-user does not need to perform any complex calculations to determine qualitatively or quantitatively the amount of process error associated with an edge.

Furthermore, note that identifying problem edges is advantageous because it allows the system to directly apply resolution enhancement techniques to these problem edges. Specifically, in the absence of an edge-detecting process-sensitivity model, the user may need to manually identify the problem edges by visually interpreting the polygon and space problem areas.

In a variation on this embodiment, the system creates the on-target process model by fitting an analytical model to process data for the semiconductor manufacturing process under nominal (e.g., optimal) process conditions.

In a variation on this embodiment, the system creates the one or more off-target process models by fitting an analytical model to process data for the semiconductor manufacturing process under process conditions that are different from nominal process conditions.

In a variation on this embodiment, the system computes the process-sensitivity model by: computing a benchmark process-sensitivity model using the on-target process model and the one or more off-target process models, wherein the benchmark process-sensitivity model accurately models the process-sensitivity information; and creating a benchmark-plot by plotting the convolution of the benchmark process-sensitivity model and a representative mask layout against the distance between two lines in the representative mask layout. Next, the system creates a candidate process-sensitivity model by selecting a set of basis functions to represent the candidate process-sensitivity model. The system then creates a candidate-plot by plotting the convolution of the candidate process-sensitivity model and the representative mask layout against the distance between the two lines in the representative mask layout. Next, the system compares the candidate-plot with the benchmark-plot. The system then updates the candidate process-sensitivity model by adjusting the set of basis functions based on the result of the comparison. Note that iteratively adjusting the set of basis functions allows the method to determine a substantially optimal set of basis functions that reduces the computation time required to compute the convolution between the process-sensitivity model and the mask layout without sacrificing the accuracy of the convolution operation.

In a variation on this embodiment, the system operates before an optical proximity correction (OPC) process is performed on the mask layout. In another variation on this embodiment, the system operates after an OPC process is performed on the mask layout.

In a variation on this embodiment, the semiconductor manufacturing process can include: photolithography, etch, chemical-mechanical polishing (CMP), trench fill, or reticle manufacture.

In a variation on this embodiment, the system operates before OPC is applied, but after other resolution enhancement techniques are applied to the mask layout. In another variation on this embodiment, the system operates after one or more resolution enhancement techniques (including OPC) are applied to the mask layout. Note that resolution enhancements techniques can include, but are not limited to, alternating phase shift mask, assist features, dual dipole illumination, chromeless phase lithography (CPL), or other illumination techniques.

BRIEF DESCRIPTION OF THE FIGURES

FIG. 8 illustrates how the system plots the convolution of a process-sensitivity model and a representative mask layout against the distance between two lines in the representative mask layout in accordance with an embodiment of the present invention.

FIG. 9A presents a candidate-plot that is different from the benchmark-plot in accordance with an embodiment of the present invention.

FIG. 9B presents a candidate-plot that is substantially similar to the benchmark-plot in accordance with an embodiment of the present invention.

DETAILED DESCRIPTION

Integrated Circuit Design and Fabrication

Figure 1:
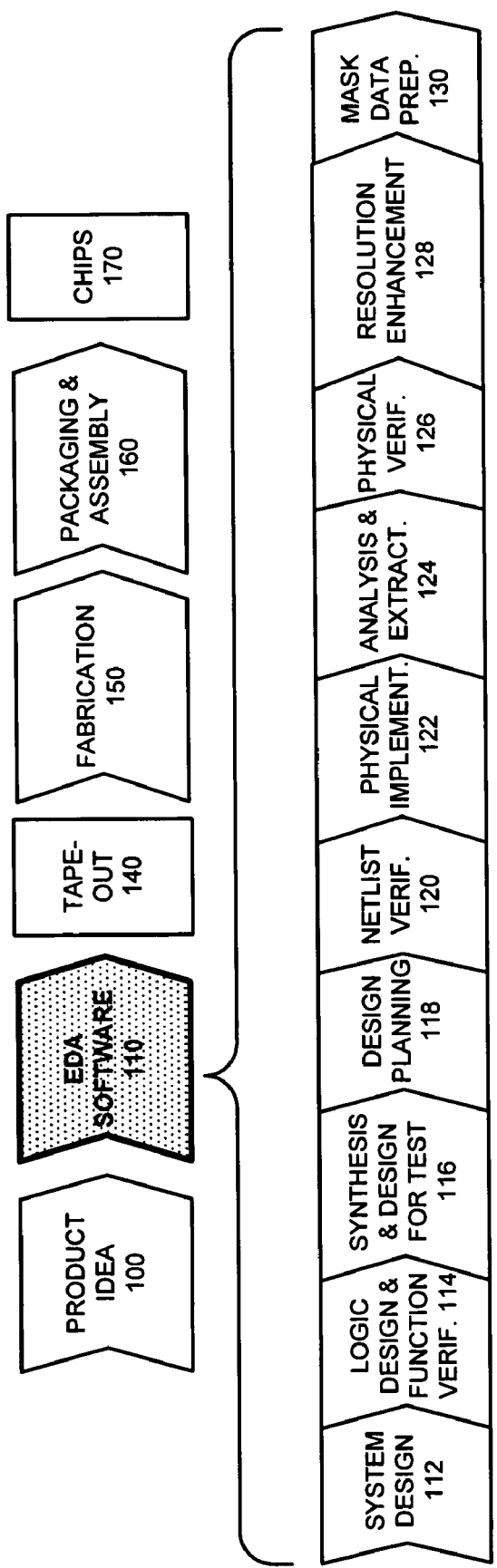
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention. The process starts with a product idea (step 100). Next, the product idea is realized using an integrated circuit, which is designed using Electronic Design Automation (EDA) software (step 110). Once the circuit design is finalized, it is taped-out (step 140). After tape-out, the process goes through fabrication (step 150), packaging, and assembly (step 160). The process eventually culminates with the production of chips (step 170).

The EDA software design step 110, in turn, includes a number of sub-steps, namely, system design (step 112), logic design and function verification (step 114), synthesis and design for test (step 116), design planning (step 118), netlist verification (step 120), physical implementation (step 122), analysis and extraction (step 124), physical verification (step 126), resolution enhancement (step 128), and mask data preparation (step 130).

Embodiments of the present invention can be used during one or more of the above described steps. For example, the SiVL® product from Synopsys, Inc. can be suitably modified to use an embodiment of the present invention to identify problem edges in a mask layout.

Process Variations

Semiconductor manufacturing technologies typically include a number of processes which involve complex physical and chemical interactions. Since it is almost impossible to perfectly control these complex physical and chemical interactions, these processes typically have process variations that can cause the characteristics of the actual integrated circuit to be different from the desired characteristics. If this difference is too large, it can lead to manufacturing problems which can reduce the yield and/or reduce the performance of the integrated circuit.

Process variations can arise due to a variety of reasons. For example, in photolithography, variations in the rotation speed of the spindle can cause the resist thickness to vary, which can cause variations in the reflectivity, which, in turn, can cause unwanted changes to the pattern's image. Similarly, bake plates—which are used to drive the solvents out of the wafer and form the pattern in photoresist—can have hot or cold spots, which can cause variations in the critical dimension (CD). Likewise, the chuck that holds the wafer during photo exposure can contain microparticles which create "hills" on the wafer's surface that can cause defocusing during lithography. Note that defocusing can also occur because the chuck is out of level, or the lens has aberrations, or the wafer is not completely flat, amongst other reasons.

It is helpful to classify process variations into two types: random and systematic. (Note that the term "depth of focus" is often used as a catch all term to describe the amount of random and systematic process variations.) Random process variations are those process variations that are not presently being modeled using an analytical model. On the other hand, systematic process variations are those process variations that are typically modeled using analytical models. For example, spindle speed variation is typically classified as a random process variation, while pattern corner rounding has been compensated for in a systematic manner. Note that, researchers are continually trying to convert random process variations into systematic process variations by creating new analytical models that model random process variations.

Manufacturing Problems

To be economically viable, a semiconductor manufacturing process has to be robust with respect to process variations, i.e., it must be able to tolerate a large enough range of process variations. Note that, improving the robustness (or depth of focus) of a process directly results in cost savings. This is because improving depth of focus reduces the amount of time spent on inspection, servicing, and maintenance of the equipment, thereby increasing the number of wafers that are run. Furthermore, improving the depth of focus can increase the yield. Due to these reasons, increasing depth of focus can substantially increase profits.

Moreover, the importance of improving depth of focus increases as a manufacturing process shifts to smaller dimensions because the inherent depth of focus in these processes becomes rapidly smaller. Specifically, at deep submicron dimensions, even a small improvement in the depth of focus can save millions of dollars in manufacturing costs.

Unfortunately, improving depth of focus can be very challenging, especially at deep submicron dimensions. To improve the manufacturability of integrated circuits, designers typically use design rule tables that specify when and how to draw circuit features. Unfortunately, at deep submicron dimensions, these design rule tables can be extremely large and unwieldy. Moreover, design rule tables can be overly restrictive which can needlessly prevent designers from being able to achieve the best performance.

Identifying Manufacturing Problem Edges in a Mask Layout

One of the primary goals of semiconductor manufacturing is to, in one measurement, get all the process variation information at a point on a mask layout. If we achieve this, we can identify and correct problem edges in a mask layout before the pattern is manufactured, thereby improving the manufacturability of the mask layout. For example, if we know that an edge at the end of a line is likely to pull back 40 nm during manufacturing, the designer can use this information to resize the pattern while it is being drawn.

Furthermore, it is very important that we identify these problem edges without using a substantial amount of computational time. Note that, problem edges can be identified by simulating various process conditions and by comparing the resulting patterns to determine areas that can cause manufacturability problems. Unfortunately, this approach can require a substantial amount of computational time because it involves running multiple complex simulation models (e.g., optical proximity correction models).

Instead, what is needed is a process that can quickly tell us whether a structure is going to be stable (i.e., it is going to print properly so that it functions according to the design tolerances) within a workable process window. (Note that determining whether a structure is stable or not depends on the type of the layer. For example, in a metal layer, significant CD variations may be acceptable as long as they do not cause a short or an open in the circuit. In contrast, in a polysilicon layer, even very small CD variations may be unacceptable.)

One embodiment of the present invention provides a system for identifying an edge in a mask layout which is likely to have manufacturing problems. Specifically, in one embodiment of the present invention, the system uses an edge-detecting process-sensitivity model to query a pattern and generate a problem indicator that identifies edges that are likely to have manufacturing problems. Based on the value of the problem indicator, the designer can decide whether the edge is likely to have problems during manufacturing and take appropriate counter measures, such as, moving or widening the associated feature.

Furthermore, in one embodiment, the system uses the problem indicator to generate a contour. Specifically, the contour can be generated by comparing the problem-indicator with a threshold. Note that generating a contour can be very useful because it interprets the process variation data and identifies the problem areas directly. Moreover the contour can be displayed using a standard optical intensity viewing tool such as the ICWorkbench™ tool from Synopsys.

Note that a key advantage of these systems and techniques is that they can capture process-sensitivity information in a single multidimensional function. Furthermore, this allows the system to directly identify the problem edge. Specifically, the system can quickly compute a problem-indicator by simply convolving the edge-detecting process-sensitivity model with another multidimensional function that represents the mask layout. The system can then compare the problem-indicator with a threshold to identify a problem edge, thereby substantially reducing the amount of computational time required to identify the manufacturing problem area. (Note that, to improve computational efficiency, a multidimensional function is often represented using a linear combination of basis functions. But, from a mathematical standpoint, the edge-detecting process-sensitivity model can still be viewed as a single multidimensional function.)

Using an Edge-Detecting Process-Sensitivity Model to Identify a Problem Edge

Figure 2:
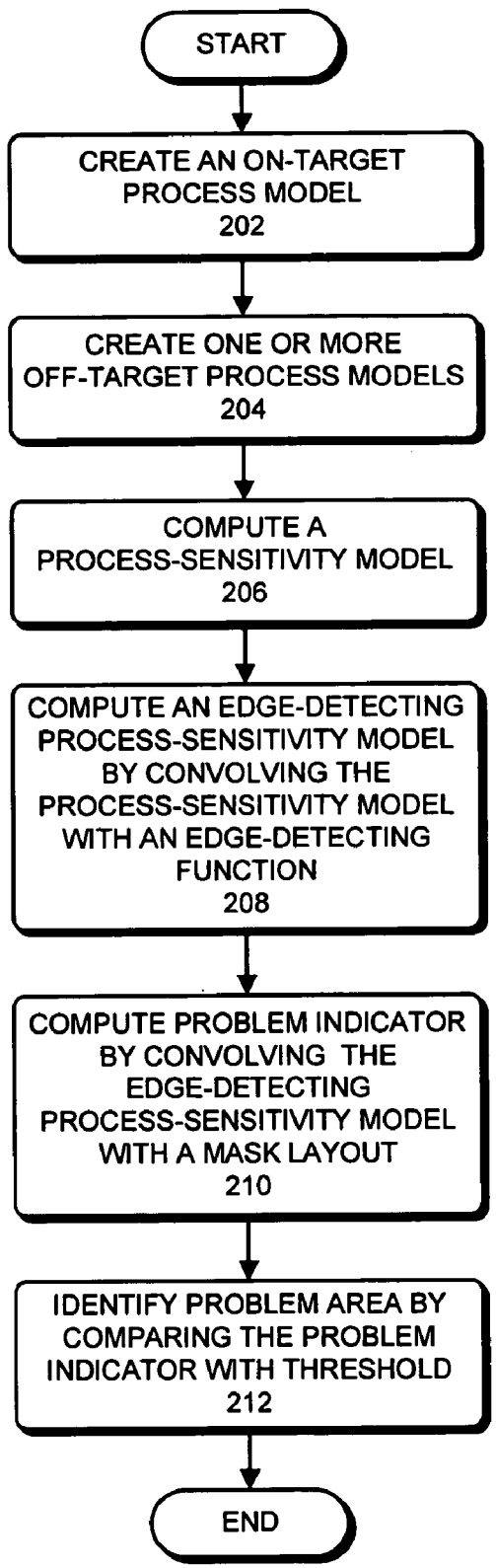
FIG. 2 presents a flowchart that illustrates the process of identifying a problem area using an edge-detecting process-sensitivity model in accordance with an embodiment of the present invention.

FIG. 2 presents a flowchart that illustrates the process of identifying a problem edge using an edge-detecting process-sensitivity model in accordance with an embodiment of the present invention.

The process starts by creating an on-target process model that models a semiconductor processing technology under nominal process conditions (step 202). Note that the semiconductor processing technology can include photolithography, etch, chemical-mechanical polishing (CMP), trench fill, and/or other technologies and combinations of the foregoing.

Next, the system creates one or more off-target process models that model the semiconductor processing technology under one or more process conditions that are different from nominal process conditions (step 204).

In one embodiment of the present invention, an on-target (or off-target) process model is represented by a multidimensional function. In another embodiment of the present invention, an on-target (or off-target) process model is represented using a set of basis functions. Furthermore, in one embodiment of the present invention, creating an on-target process model involves fitting an analytical model to process data for the semiconductor manufacturing process under nominal (e.g., optimal) process conditions. On the other hand, creating the one or more off-target process models can involve fitting an analytical model to process data for the semiconductor manufacturing process under arbitrary (e.g., non-optimal) process conditions. Note that, in one embodiment of the present invention, the one or more off-target process models can be created by analytically perturbing the on-target process model.

The system then computes a process-sensitivity model using the on-target process model and one or more off-target process models (step 206).

Figure 3A:
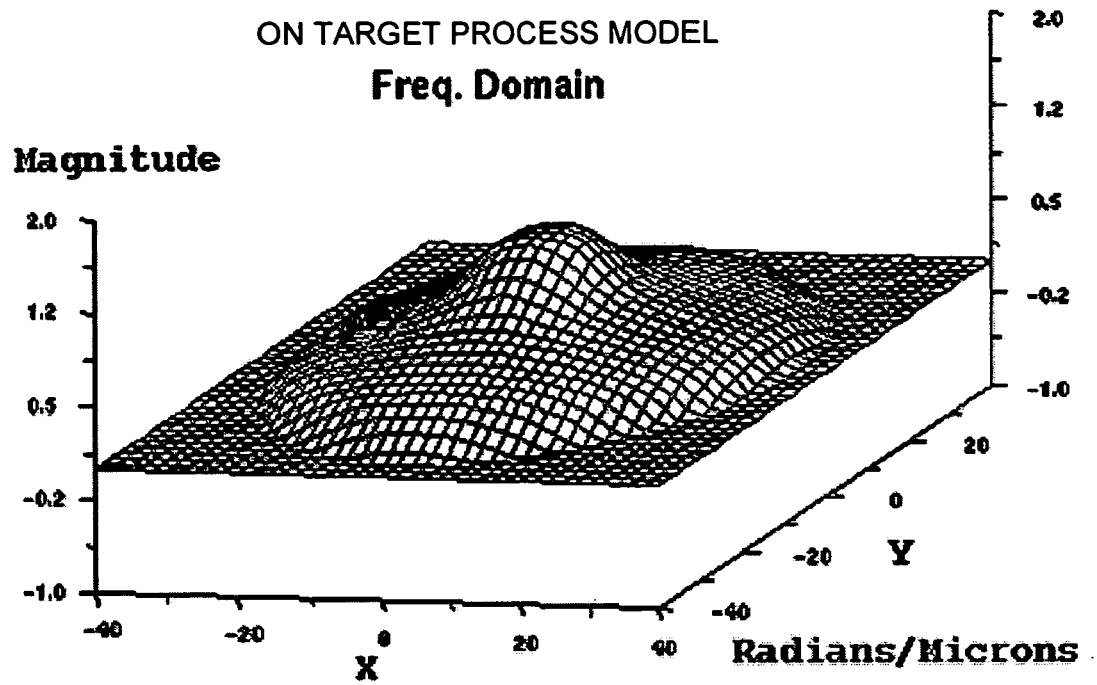
FIG. 3A illustrates a plot of a 2-D function that represents an on-target process model in accordance with an embodiment of the present invention.

FIG. 3A illustrates a plot of a 2-D function that represents an on-target process model in accordance with an embodiment of the present invention.

Figure 3B:
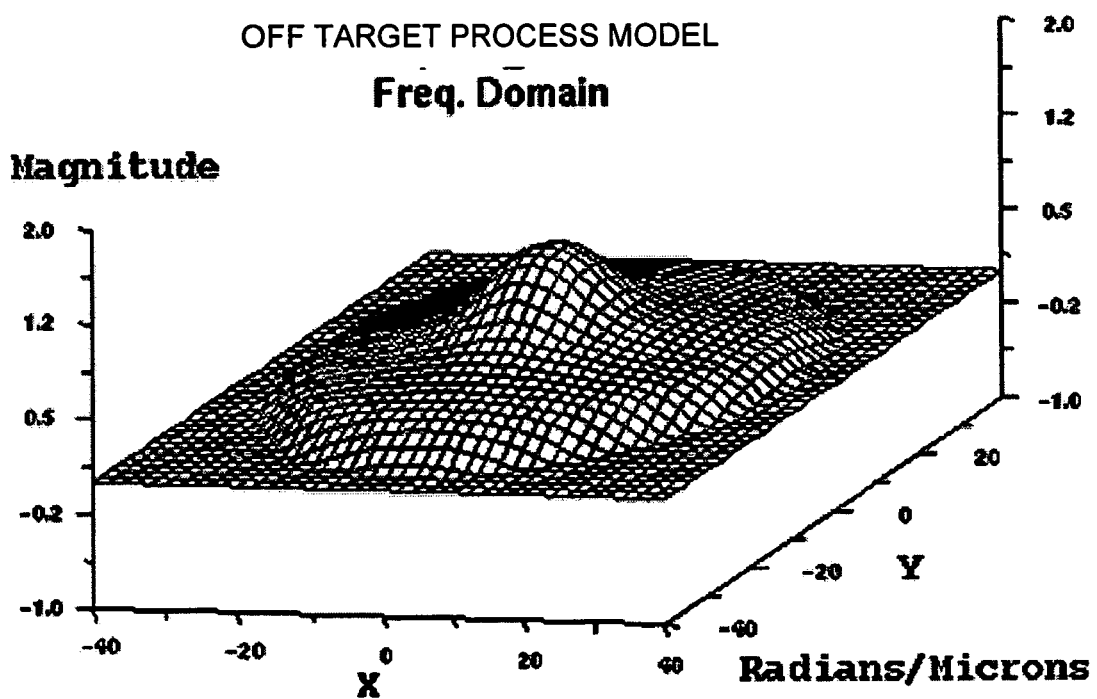
FIG. 3B illustrates a plot of a 2-D function that represents an off-target process model in accordance with an embodiment of the present invention.

FIG. 3B illustrates a plot of a 2-D function that represents an off-target process model in accordance with an embodiment of the present invention.

Figure 3C:
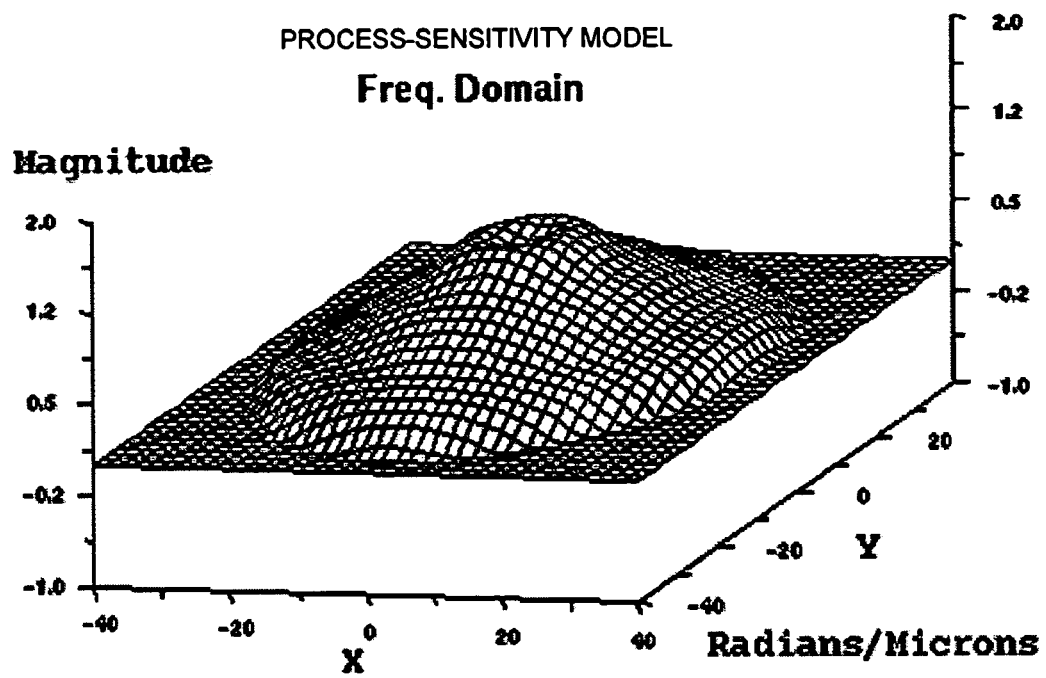
FIG. 3C illustrates a plot of a 2-D function that represents a process-sensitivity model in accordance with an embodiment of the present invention.

FIG. 3C illustrates a plot of a process-sensitivity model in accordance with an embodiment of the present invention.

Note that the 2-D functions illustrated in FIG. 3A and FIG. 3B represent the on-target and the off-target process models, respectively, in the spatial frequency domain. Furthermore, in FIG. 3A, FIG. 3B, and FIG. 3C, the X and Y axes identify a spatial-frequency component (in units of radians per micron), whereas the Z axis indicates the magnitude of a specific spatial-frequency component. These process models can also be represented using a 2-D function in a different domain, such as, the space domain. Additionally, these process models can also be represented in other coordinate systems, such as, polar coordinates.

In one embodiment of the present invention, the system computes the process-sensitivity model by computing a linear combination of the on-target process model and the one or more off-target process models. Specifically, the system can compute the process-sensitivity model by subtracting each off-target process model in the one or more off-target process models from the on-target process model. Note that the process-sensitivity model models the pattern features that are lost during defocus.

Specifically, consider the optical lithography case. Let $P_t$ represent an on-target process model, i.e., let $P_t$ model the optical lithography process when it is in focus. Furthermore, let $P_d$ represent an off-target process model, e.g., let $P_d$ model the optical lithography process when it is defocused. Now, the process-sensitivity model, $F_p$, can be computed as follows: $F_p = (P_t - P_d)/\Delta P_d$, where $\Delta P_d$ is the focus offset (in units of length).

Note that in the above example, we only considered a single off-target process model. But, we can have two or more off-target process models. In general, the process-sensitivity model, $F_p$, can be computed as follows:

$$F_p = \frac{1}{n}\left(\frac{1}{\Delta P_1}(P_t - P_1) + \frac{1}{\Delta P_2}(P_t - P_2) + \ldots + \frac{1}{\Delta P_n}(P_t - P_n)\right),$$

where, $P_{1..n}$ are off-target process models that model arbitrary (e.g., non-optimal) process conditions, $P_t$ is the on-target process model that models a nominal (e.g., optimal) process condition, and $\Delta P_{1..n}$ are the respective changes in the process conditions between the nominal process condition and the arbitrary (1..n) process conditions.

For example, let $P_t$ model the optical lithography process when it is in focus. Furthermore, let $P_{dn}$ model the optical lithography process when it is negatively defocused, i.e., the distance between the lens and the wafer is less than the on-target distance. Additionally, let $P_{dp}$ model the optical lithography process when it is positively defocused, i.e., the distance between the lens and the wafer is larger than the on-target distance. Now, the process-sensitivity model, $F_p$, can be computed as follows:

$$F_p = \frac{1}{2}\left(\frac{(P_0 - P_{dn})}{\Delta P_{dn}} + \frac{(P_0 - P_{dp})}{\Delta P_{dp}}\right),$$

where $\Delta P_{dn}$ and $\Delta P_{dp}$ are the negative and positive focus offsets (in units of length).

Note that, $(P_t - P_{dn})/\Delta P_{dn}$ and $(P_t - P_{dp})/\Delta P_{dp}$ model the pattern features that are lost during negative and positive defocusing, respectively. In the above example, we compute the process-sensitivity model, $F_p$, by adding $(P_t - P_{dn})/\Delta P_{dn}$ and $(P_t - P_{dp})/\Delta P_{dp}$, and by dividing by 2 to normalize the process-sensitivity model. (Note that the process-sensitivity model can also be used without normalization.)

Continuing with the flowchart in FIG. 2, the system then computes an edge-detecting process-sensitivity model by convolving the process-sensitivity model with an edge-detecting function which can be used to detect edges in an image (step 208).

Figure 3D:
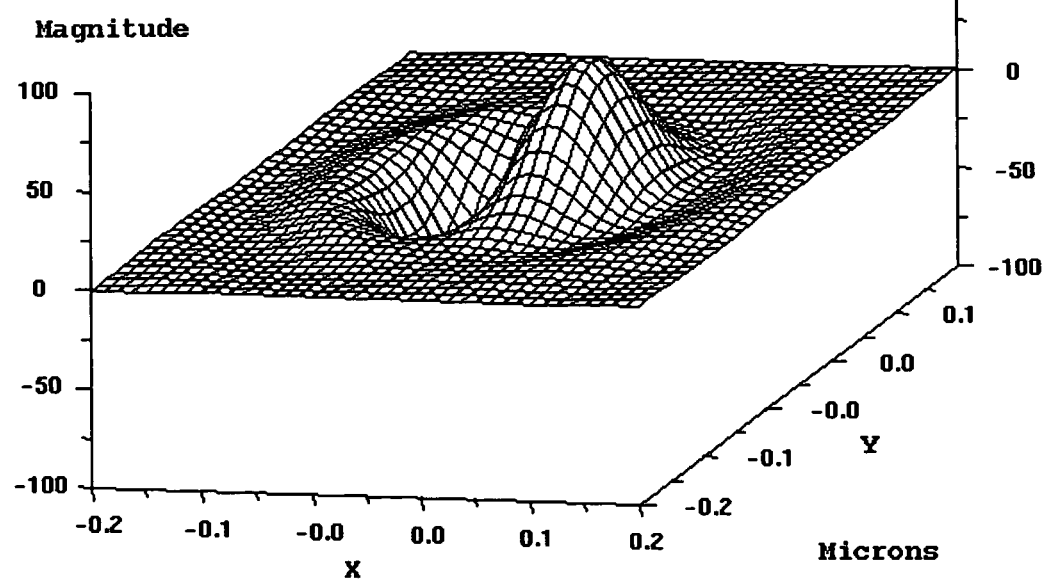
FIG. 3D illustrates a plot of a 2-D function that represents an edge detecting function in accordance with an embodiment of the present invention.

FIG. 3D illustrates a plot of a 2-D function that represents a horizontal edge-detecting function in accordance with an embodiment of the present invention. Note that the X and Y axes in FIG. 3D represent the 2-D spatial coordinates (in microns), whereas the Z axis indicates the magnitude of the edge-detecting function. Furthermore, note that a vertical edge-detecting function can be illustrated by rotating the function illustrated in FIG. 3D by 90°.

In one embodiment, the system uses the following edge-detecting functions (expressed in polar coordinates):

$$E_1 = \frac{J_1(ar)}{(ar)^2 - j_{11}^2} \cdot \cos\theta$$

$$E_2 = \frac{J_1(ar)}{(ar)^2 - j_{11}^2} \cdot \sin\theta,$$

where, $E_1$ and $E_2$ are the edge-detecting functions, $J_1$ is the Bessel function of the first kind of order 1, $a$ is the maximum spatial frequency, $r$ is the radial distance between the origin and the evaluation point, $j_{11}$ is the first root of $J_1$, and $\theta$ is the angle between the X-axis and a line that passes through the origin and the evaluation point. (Note that, the first function, $E_1$, detects vertical edges, while the second function, $E_2$, detects horizontal edges. Further, the sum of squares of the convolution results from these functions can detect edges in any direction.)

Next, the system identifies a problem edge in the mask layout using the edge-detecting process-sensitivity model. Specifically, the system first computes a problem indicator by convolving the edge-detecting process-sensitivity model with a multidimensional (e.g., 2-D) function that represents the mask layout (step 210). (Note that, the convolution operation is typically performed in the space domain.)

Next, the system identifies the problem edge in the mask layout by comparing the value of the problem-indicator with a threshold to identify a problem edge in the mask layout (step 212).

Note that, by using appropriate off-target process models, the above described process can readily identify manufacturing problems that occur due to various mask-layout related reasons.

Figure 4:
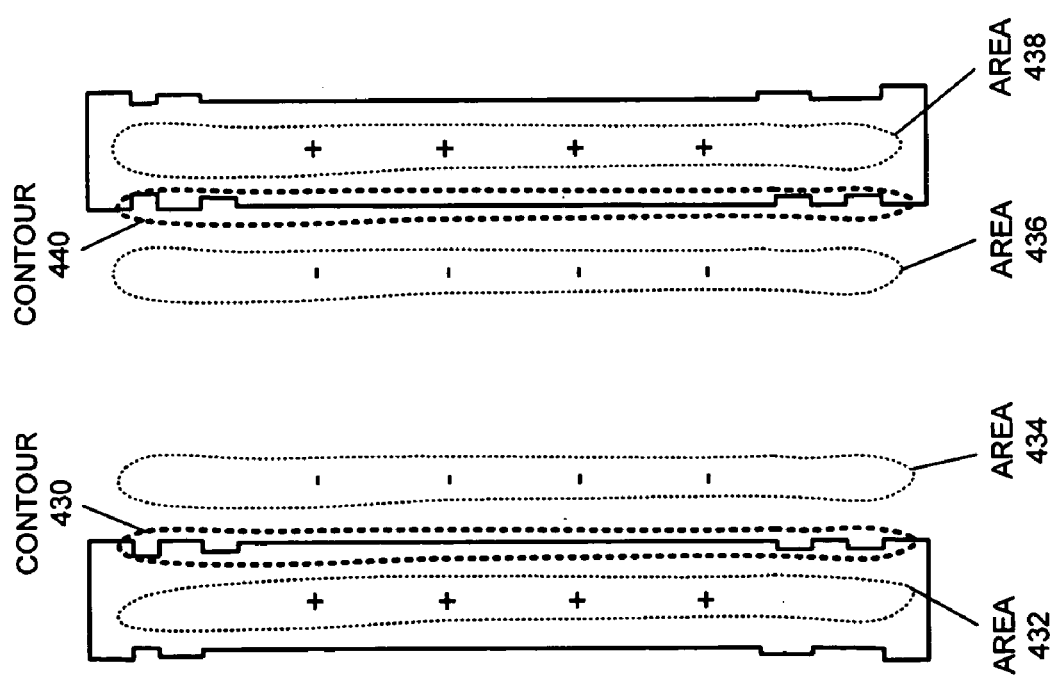
FIG. 4 illustrates how the system can identify a problem edge using an edge-detecting process-sensitivity model in accordance with an embodiment of the present invention.

FIG. 4 illustrates how the system can identify a problem edge using an edge-detecting process-sensitivity model in accordance with an embodiment of the present invention.

First, let us examine how the system identifies problem areas using a process-sensitivity model. Specifically, contours 432 and 438 identify areas where the value of the convolution of the process-sensitivity model and the mask layout is greater than a "high" threshold, which can indicate potential polygon problems. Contours 434 and 436, on the other hand, identify areas where the result of the convolution is less than a "low" threshold which can indicate potential space problems.

Note that, since the value of the convolution is high in the area outlined by contour 432, and the value of the convolution is low in the area outlined by contour 434, we can use an edge-detecting function to identify an edge that lies between these areas. (Note that image processing applications often use such edge-detecting functions to identify edges between light and dark areas.) For example, the system can use an edge-detecting process-sensitivity model to generate contours 430 and 440, which clearly identify problem edges in the mask layout.

Furthermore, note that identifying problem edges is advantageous because it allows the system to directly apply resolution enhancement techniques to these problem edges. Specifically, in the absence of an edge-detecting process-sensitivity model, the user may need to manually identify the problem edges by visually interpreting the polygon and space problem areas or perform complex searches to find maxima and minima points around an edge.

Additionally, note that the system can compute the problem-indicator using a number of techniques. For example, in one embodiment, the problem-indicator may be computed at an evaluation point by first integrating an aerial-image intensity based function over an area around the evaluation point. The system can then compute the problem-indicator by taking the partial derivative of the integral with respect to the defocus offset.

Figure 5:
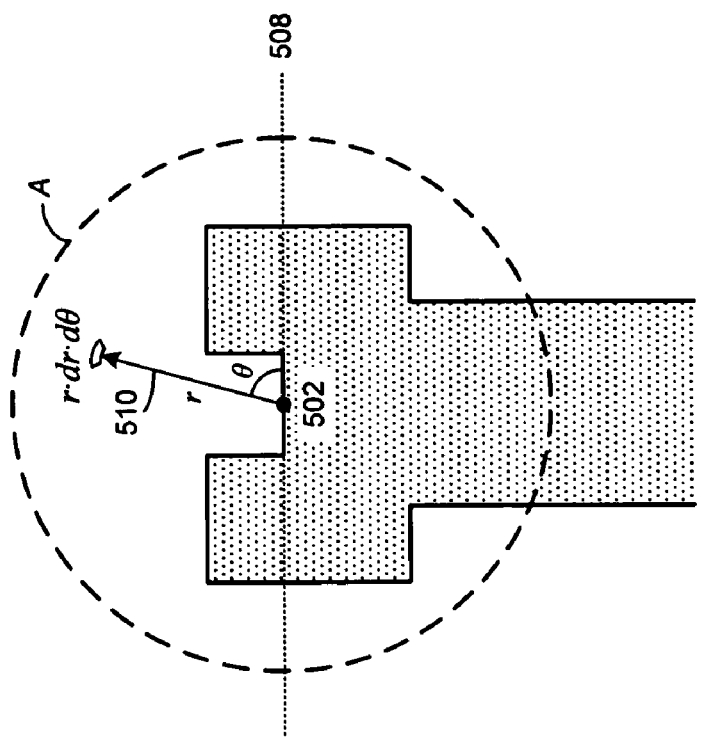
FIG. 5 illustrates how a problem-indicator can be computed by integrating a function in accordance with an embodiment of the present invention.

FIG. 5 illustrates how a problem-indicator can be computed by integrating a function in accordance with one embodiment of the present invention.

Let I(r, θ) represent a function in polar coordinates, where r is the radial distance between evaluation point 502 and elemental area r·dr·dθ, and θ is the angle between reference line 508 and line 510 which passes through evaluation point 502 and elemental area r·dr·dθ.

The system can compute the surface integral, P, of the function over area A as follows:

$$P = \iint_A I(r,\theta) \cdot r \cdot dr \cdot d\theta.$$

Next, the system can compute the problem-indicator at the evaluation point by computing the partial derivative of P with respect to the defocus offset.

Figure 6A:
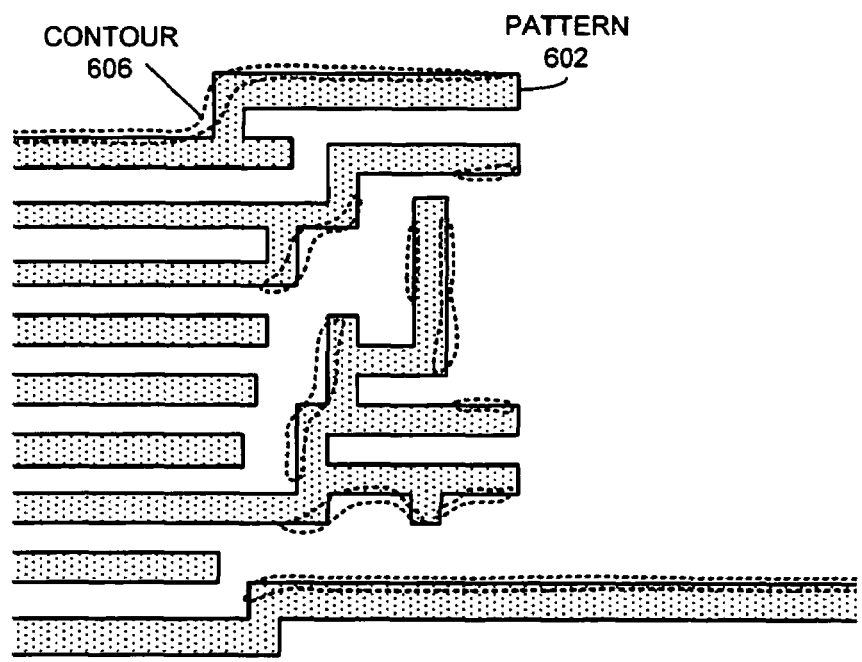
FIGS. 6A and 6B illustrate how a process-sensitivity model can be used to identify edges in a mask layout which are likely to cause manufacturing problems in accordance with an embodiment of the present invention.
Figure 6B:
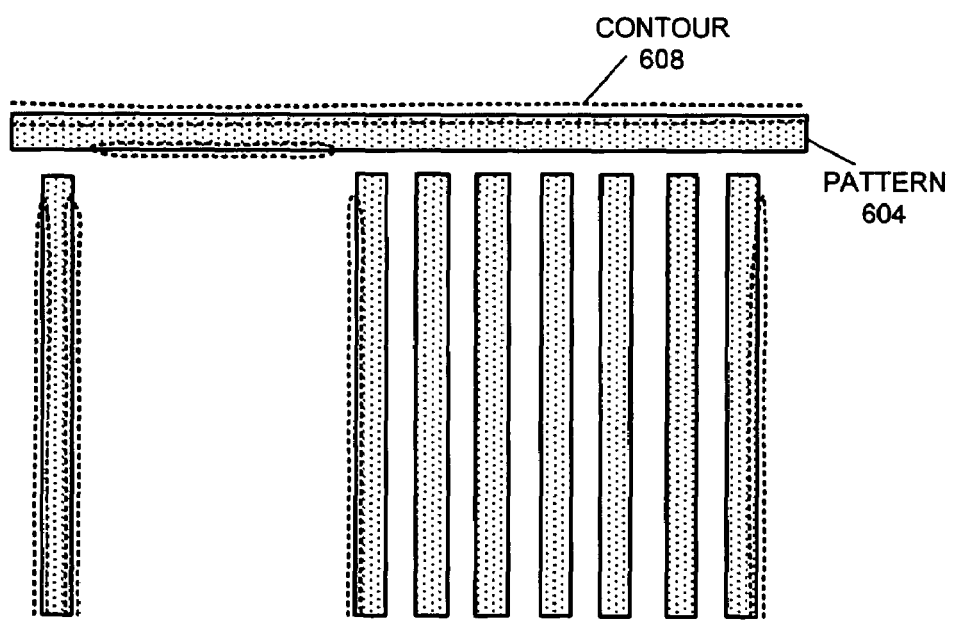

FIGS. 6A and 6B illustrate how a process-sensitivity model can be used to identify edges in a mask layout which are likely to cause manufacturing problems in accordance with an embodiment of the present invention.

The mask layout shown in FIG. 6A includes a number of uncorrected patterns, such as pattern 602. Note that, once these patterns are corrected using OPC, they can be used to create desired patterns on a wafer (not shown for the sake of clarity). In one embodiment of the present invention, the system uses an edge-detecting process-sensitivity model to generate a contour, such as contour 606, to clearly identify problem edges in the mask layout that can cause manufacturing problems.

For example, contours 606 and 608 clearly identify problem edges in patterns 602 and 604, respectively. Note that the system generates these contours by comparing a problem indicator with a problem threshold. Furthermore, in another embodiment, the system can generate multiple contours by comparing the problem indicator with multiple problem thresholds, wherein each problem threshold is associated with a problem severity. Moreover, in one embodiment of the present invention, the system displays the contours (which identify manufacturing problem edges) using a standard optical intensity viewing tool. Note that the system can use a variety of techniques to highlight the manufacturing problem edges by modifying an image of the mask layout in the proximity of the identified manufacturing problem edges. For example, in one embodiment, the system can use a contrasting color to highlight the problem edges. In another embodiment, the system can use rectangular shaped contours to highlight the problem edges.

Furthermore, note that the system can identify problem areas in an uncorrected or corrected mask layout. For example, the system can identify problem areas in a mask layout before an OPC process is performed on the mask layout. Specifically, in one embodiment of the present invention, the system adjusts the problem threshold to effectively compensate for the OPC on the uncorrected pattern.

On the other hand, the system can operate after certain resolution enhancement techniques (RETs) have been applied to the mask layout. These RETs include, but are not limited to, alternating phase shift mask, assist features, dual dipole illumination, or chromeless phase lithography (CPL).

Note that the system can operate before an OPC process is performed because an OPC process usually does not substantially change the spatial frequency components or phase characteristics of a mask layout. On the other hand, assist features, for example, can substantially change the spatial frequency components of a mask layout. Hence, these RETs are usually performed before the system is used to identify problem areas in a mask layout.

Representing the Process-Sensitivity Model Using Basis Functions

Process models (on-target, off-target, and process-sensitivity) are often represented using a set of basis functions to reduce the computation time required to convolve the process model with a mask layout. Note that, in choosing the set of basis functions, we need to be mindful of the inherent tradeoff between speed and accuracy. Specifically, reducing the number of basis functions increases the speed of the convolution, but decreases the accuracy. Hence, the set of basis functions needs to be small enough to speed up the convolution, but large enough to generate accurate results.

Figure 7:
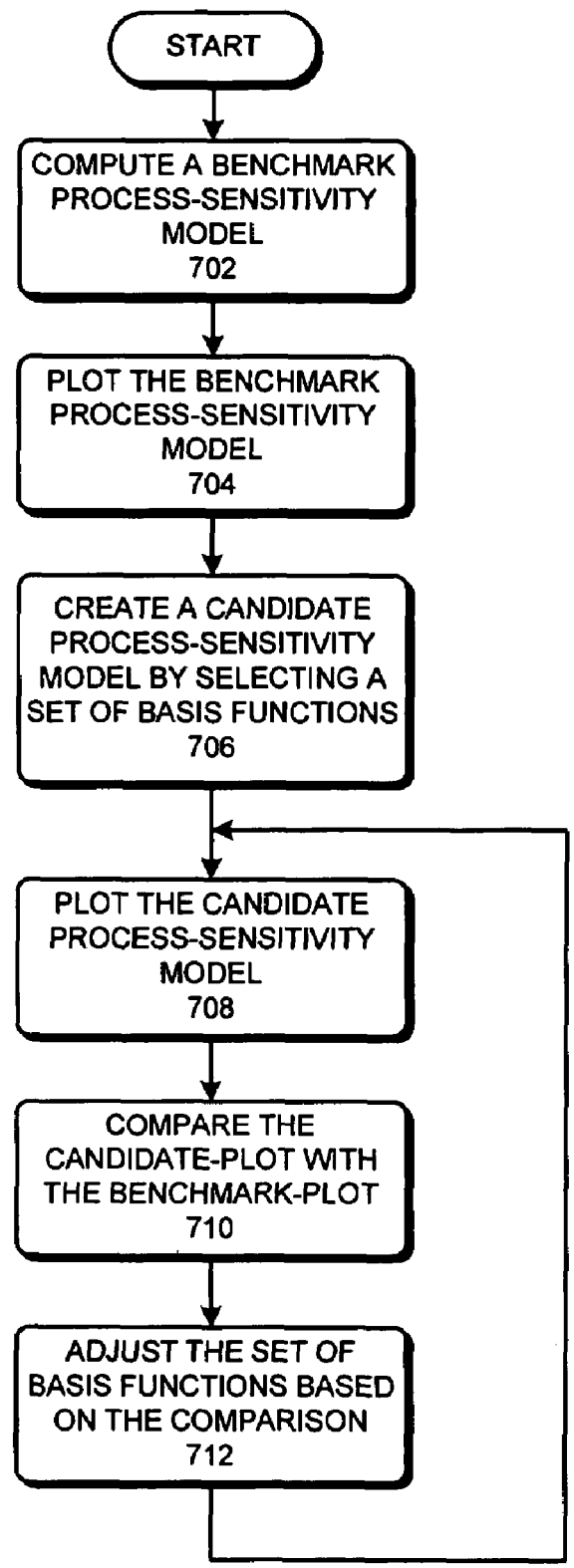
FIG. 7 presents a flowchart that illustrates a process for determining a set of basis functions to reduce the computation time required to convolve the process-sensitivity model with a mask layout without sacrificing accuracy in accordance with an embodiment of the present invention.

FIG. 7 presents a flowchart that illustrates a process for determining a set of basis functions to reduce the computation time required to convolve the process-sensitivity model with a mask layout without sacrificing accuracy in accordance with an embodiment of the present invention.

The process typically begins by computing a benchmark process-sensitivity model using the on-target process model and the one or more off-target process models, wherein the benchmark process-sensitivity model accurately models the process-sensitivity information (step 702).

The system then creates a benchmark-plot by plotting the convolution of the benchmark process-sensitivity model and a representative mask layout against the distance between two lines in the representative mask layout (step 704).

FIG. 8 illustrates how the system plots the convolution of a process-sensitivity model and a representative mask layout against the distance between two lines in the representative mask layout in accordance with an embodiment of the present invention.

The representative mask layout shown in FIG. 8 contains two lines: fixed line 802 and movable line 804 that is used for varying the distance between the two lines. In one embodiment, the system first creates a number of different layout configurations by moving line 804. Note that the distance 806 between the two lines is different in each layout configuration. Next, the system convolves a process-sensitivity model with each layout configuration and computes the value of the convolution at an evaluation point, such as evaluation point 808, in the mask layout. The system then plots these convolution values against the distance between the two lines.

Continuing with the flowchart in FIG. 7, the system then creates a candidate process-sensitivity model by selecting a set of basis functions to represent the candidate process-sensitivity model (step 706).

Next, the system computes the process-sensitivity model by iteratively adjusting the set of basis functions.

Specifically, the system creates a candidate-plot by plotting the convolution of the candidate process-sensitivity model with the representative mask layout against the distance between the two lines in the representative mask layout (step 708).

The system then compares the candidate-plot with the benchmark-plot (step 710). In one embodiment, the system normalizes the plots before comparing them. Note that we are primarily interested in comparing the "shapes" of the two plots. Specifically, the candidate-plot and the benchmark-plot are said to have the same shape if and only if we can obtain the benchmark-plot by applying a linear transformation to the candidate-plot.

FIG. 9A presents a candidate-plot that is different from the benchmark-plot in accordance with an embodiment of the present invention.

FIG. 9B presents a candidate-plot that is substantially similar to the benchmark-plot in accordance with an embodiment of the present invention.

Next, the system updates the candidate process-sensitivity model by adjusting the set of basis functions based on the result of the comparison (step 712). The system then returns to step 708.

Note that the system can use a number of techniques to adjust the set of basis functions based on the result of the comparison. For example, if the candidate-plot is different from the benchmark-plot, the system can add one or more basis functions to the set of basis functions to try to improve the accuracy of the candidate process-sensitivity model. On the other hand, if the candidate-plot is substantially similar to the benchmark-plot, the system can remove one or more basis functions from the set to try to improve convolution performance without sacrificing accuracy. Note that the ambit size and sampling space can also be adjusted by adding and/or removing appropriate basis functions to the set of basis functions.

Furthermore, note that the system can terminate the loop based on a number of criteria. For example, in one embodiment, the system can terminate the loop after a predetermined number of iterations. In another embodiment, the system can terminate the loop if it determines that removing any of the basis functions in the set of basis functions can substantially reduce the accuracy of a subsequent convolution operation.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent.

For example, embodiments of the present invention can be used to identify problem edges in mask layouts for manufacturing micro-electro-mechanical systems (MEMS).

Additionally, the above disclosure is not intended to limit the present invention. The scope of the present invention is defined by the appended claims.

What is claimed is:

1. A method for identifying a problem edge in an uncorrected or corrected mask layout which is to have manufacturing problems, the method comprising:
    creating an on-target process model that models a semiconductor manufacturing process under nominal process conditions;
    creating one or more off-target process models that model the semiconductor manufacturing process under one or more process conditions that are different from nominal process conditions;
    computing a process-sensitivity model using the on-target process model and the one or more off-target process models, wherein the process-sensitivity model-models sensitivity to variations in process conditions, and wherein computing of the process-sensitivity model comprises computing a linear combination of the on-target process model and the one or more off-target process models;

computing an edge-detecting process-sensitivity model by convolving the process-sensitivity model with an edge-detecting function which is used to detect edges in an image; and identifying a problem edge using the edge-detecting process-sensitivity model, comprising:
  computing a problem-indicator by convolving the edge-detecting process-sensitivity model with a multidimensional function that represents the mask layout; and
  comparing the value of the problem-indicator with a threshold to identify the problem edge in the mask layout.

2. The method of claim 1, wherein computing the process-sensitivity model involves computing a linear combination of the on-target process model and the one or more off-target process models.

3. The method of claim 1, wherein creating the on-target process model involves fitting an analytical model to process data for the semiconductor manufacturing process under nominal process conditions;
  wherein creating the one or more off-target process models involves fitting an analytical model to process data for the semiconductor manufacturing process under process conditions that are different from nominal process conditions.

4. The method of claim 1, wherein computing the process-sensitivity model involves:
  computing a benchmark process-sensitivity model using the on-target process model and the one or more off-target process models, wherein the benchmark process-sensitivity model accurately models the process-sensitivity information;
  creating a benchmark-plot by plotting the convolution of the benchmark process-sensitivity model and a representative mask layout against the distance between two lines in the representative mask layout;
  creating a candidate process-sensitivity model by selecting a set of basis functions to represent the candidate process-sensitivity model; and
  computing the process-sensitivity model by, iteratively,
    creating a candidate-plot by plotting the convolution of the candidate process-sensitivity model and the representative mask layout against the distance between the two lines in the representative mask layout;
    comparing the candidate-plot with the benchmark-plot; and
    updating the candidate process-sensitivity model by adjusting the set of basis functions based on the result of the comparison;
  wherein iteratively adjusting the set of basis functions allows the method to determine a substantially optimal set of basis functions that reduces the computation time required to compute the convolution between the process-sensitivity model and the mask layout without sacrificing the accuracy of the convolution operation.

5. The method of claim 1, wherein the semiconductor manufacturing process can include:
  photolithography;
  etch;
  chemical-mechanical polishing (CMP);
  trench fill; or
  reticle manufacture.

6. The method of claim 1, wherein the method is performed after one or more resolution enhancement techniques have been applied to the mask layout, wherein the resolution enhancement techniques can include:
  alternating phase shift mask;
  assist features;
  dual dipole illumination; or
  chromeless phase lithography (CPL).

7. A computer-readable storage medium storing instructions that when executed by a computer cause the computer to perform a method for identifying a problem edge in an uncorrected or corrected mask layout which is likely to have manufacturing problems, the method comprising:
  creating an on-target process model that models a semiconductor manufacturing process under nominal process conditions;
  creating one or more off-target process models that model the semiconductor manufacturing process under one or more process conditions that are different from nominal process conditions;
  computing a process-sensitivity model using the on-target process model and the one or more off-target process models, wherein the process-sensitivity model models sensitivity to variations in process conditions, and wherein computing of the process-sensitivity model comprises computing a linear combination of the on-target process model and the one or more off-target process models;
  computing an edge-detecting process-sensitivity model by convolving the process-sensitivity model with an edge-detecting function which is used to detect edges in an image; and
  identifying a problem edge using the edge-detecting process-sensitivity model, comprising:
    computing a problem-indicator by convolving the edge-detecting process-sensitivity model with a multidimensional function that represents the mask layout; and
    comparing the value of the problem-indicator with a threshold to identify the problem edge in the mask layout.

8. The computer-readable storage medium of claim 7, wherein computing the process-sensitivity model involves computing a linear combination of the on-target process model and the one or more off-target process models.

9. The computer-readable storage medium of claim 7, wherein creating the on-target process model involves fitting an analytical model to process data for the semiconductor manufacturing process under nominal process conditions;
  wherein creating the one or more off-target process models involves fitting an analytical model to process data for the semiconductor manufacturing process under process conditions that are different from nominal process conditions.

10. The method of claim 7, wherein computing the process-sensitivity model involves:
  computing a benchmark process-sensitivity model using the on-target process model and the one or more off-target process models, wherein the benchmark process-sensitivity model accurately models the process-sensitivity information;
  creating a benchmark-plot by plotting the convolution of the benchmark process-sensitivity model and a representative mask layout against the distance between two lines in the representative mask layout;
  creating a candidate process-sensitivity model by selecting a set of basis functions to represent the candidate process-sensitivity model; and
  computing the process-sensitivity model by, iteratively,
    creating a candidate-plot by plotting the convolution of the candidate process-sensitivity model and the representative mask layout against the distance between the two lines in the representative mask layout;

comparing the candidate-plot with the benchmark-plot; and updating the candidate process-sensitivity model by adjusting the set of basis functions based on the result of the comparison;

wherein iteratively adjusting the set of basis functions allows the method to determine a substantially optimal set of basis functions that reduces the computation time required to compute the convolution between the process-sensitivity model and the mask layout without sacrificing the accuracy of the convolution operation.

11. The computer-readable storage medium of claim 7, wherein the semiconductor manufacturing process can include:

photolithography;
etch;
chemical-mechanical polishing (CMP);
trench fill; or
reticle manufacture.

12. The computer-readable storage medium of claim 7, wherein the method is performed after one or more resolution enhancement techniques have been applied to the mask layout, wherein the resolution enhancement techniques can include:

alternating phase shift mask;
assist features;
dual dipole illumination; or
chromeless phase lithography (CPL).

13. A method for improving the manufacturability of an uncorrected or corrected mask layout, the method comprising:

identifying a problem edge in the mask layout using an edge-detecting process-sensitivity model, wherein the edge-detecting process-sensitivity model models sensitivity to variations in process conditions, and wherein the edge-detecting process-sensitivity model can be created by:

creating an on-target process model that models a semiconductor manufacturing process under nominal process conditions;

creating one or more off-target process models that model the semiconductor manufacturing process under one or more process conditions that are different from nominal process conditions;

creating a process-sensitivity model using the on-target process model and the one or more off-target process models, wherein computing the process-sensitivity model involves:

computing a benchmark process-sensitivity model using the on-target process model and the one or more off-target process models, wherein the benchmark process-sensitivity model accurately models the process-sensitivity information;

creating a benchmark-plot by plotting the convolution of the benchmark process-sensitivity model and a representative mask layout against the distance between two lines in the representative mask layout;

creating a candidate process-sensitivity model by selecting a set of basis functions to represent the candidate process-sensitivity model; and computing the process-sensitivity model by, iteratively, creating a candidate-plot by plotting the convolution of the candidate process-sensitivity model and the representative mask layout against the distance between the two lines in the representative mask layout;

comparing the candidate-plot with the benchmark-plot; and updating the candidate process-sensitivity model by adjusting the set of basis functions based on the result of the comparison;

wherein iteratively adjusting the set of basis functions allows the method to determine a substantially optimal set of basis functions that reduces the computation time required to compute the convolution between the process-sensitivity model and the mask layout without sacrificing the accuracy of the convolution operation; and computing the edge-detecting process-sensitivity model by convolving the process-sensitivity model with an edge-detecting function which can be used to detect edges in an image.

14. The method of claim 13, wherein identifying the problem edge involves:

convolving the edge-detecting process-sensitivity model with a second multidimensional function that represents the mask layout; and identifying the problem edge using the result of the convolution.

* * * * *

UNITED STATES PATENT AND TRADEMARK OFFICE
CERTIFICATE OF CORRECTION

PATENT NO.         : 7,320,119 B2                                      Page 1 of 1
APPLICATION NO.    : 11/124328
DATED              : January 15, 2008
INVENTOR(S)        : Lawrence S. Melvin, III et al.

It is certified that error appears in the above-identified patent and that said Letters Patent is hereby corrected as shown below:

On the Title Page, Item (75), for the third-listed inventor, Qilaing Yan, please delete "Hillsboro" and insert --Portland-- so that the third-listed inventor's address appears as --Portland, OR--

Signed and Sealed this

Twenty-first Day of October, 2008

JON W. DUDAS
*Director of the United States Patent and Trademark Office*